May 9, 1972 T. BRADLEY Re. 27,348

DISPOSABLE OFFICE GOWN

Original Filed Sept. 27, 1966

INVENTOR
THEODORE BRADLEY

BY Semmes & Semmes
ATTORNEYS

United States Patent Office

Re. 27,348
Reissued May 9, 1972

27,348

DISPOSABLE OFFICE GOWN

Theodore Bradley, 147 Eldorado St.,
Monterey, Calif. 93940

Original No. 3,399,406, dated Sept. 3, 1968, Ser. No. 584,322, Sept. 27, 1966, which is a continuation-in-part of Ser. No. 534,903, Mar. 16, 1966. Application for reissue Aug. 28, 1970, Ser. No. 68,058
Int. Cl. A41d *9/00*
U.S. Cl. 2—114 4 Claims

Matter enclosed in heavy brackets [ ] appears in the original patent but forms no part of this reissue specification; matter printed in italics indicates the additions made by reissue.

*ABSTRACT OF THE DISCLOSURE*

*The present application relates to a disposable examination gown of the type adapted for hospital or clinical use wherein portions of the gown may be opened for observation and examination of the patient, then re-sealed for normal wear of the gown upon conclusion of the examination.*

The present application is a continuation-in-part of Ser. No. 534,903, filed Mar. 16, 1966, and entitled, Disposable Examination Gowns, *now U.S. Pat. No. 3,451,-062.*

The present invention relates generally to disposable examination gowns, particularly for use in offices.

Numerous previous inventors, such as Hutchison (Pat. 1,080,451); Durand (Pat. 2,680,850); Jelstrup (Pat. 2,692,989); Palm (Pat. 2,701,364); Schaffer (Pat. 2,715,-902); De Witt (Pat. 2,768,383); O'Donnel (Pat. 2,818,-573); Melges (Pat. 3,037,507); Lewis (Pat. 3,154,789); Derrick (Pat. 3,155,984); MacDonald (Pat. 3,160,891); Hrubecky (Pat. 3,196,874); E. L. Ricter (Pat. 3,218,649); L. G. Sabee (Pat. 3,230,546); J. J. Grimm (Pat. 3,156,-927); and C. W. Brainard (Pat. 2,973,523) have addressed themselves to the problem of designing disposable examining gowns. However, the present gown designs are believed to constitute important improvements in the field.

Office disposable examining gowns ideally must be designed to permit observation and examination of both breasts at the same time, as pathology in the breast, which may cause minor distortion of the breast or difference in the size of the two breasts, may not be obvious when one breast is observed by itself, but may be immediately obvious when the two breasts are compared.

Similarly, it is important to be able to examine the base of the neck and the axillae in continuity with the examination of the breasts since the tail of the breast extends into the axilla, and since pathology in the breast spreads to the lymph nodes in the axilla and to the lymph nodes in the base of the neck. Examination of the axilla is best done with the patient's hands first on their hips so that the examiner's fingers may palpate the lymph nodes in the apex of the axilla and then with the patient's arm raised upwards over the head so that the lymph nodes along the lateral wall of the axilla may be palpated. This examination should be continuous with the examination of the breast since pathology in the breast spreads to the axilla. Gowns that allow the breasts to be examined by turning flaps laterally will obscure the axillae and prevent the breasts and axillae from being examined in continuity. Ausculation of the chest requires, of course, a comparison of the two sides of front of chest, and then both sides of the back of the chest. Thus, disposable examining gowns must provide for examination of both front and back.

Accordingly, an object of the present invention is to provide an office disposable examining gown characterized by simplicity in design and low cost of manufacture, while permitting all examination functions to be performed.

Another object of the present invention is to provide an office disposable gown permitting examination of breasts, axialla and base of neck in continuity without obstruction by gown.

Another object of the present office disposable gown design is to provide a simplified technique for reattaching portions of the gown, as desired.

Still another object of the present invention is to provide an office disposable gown permitting covering of front of chest while back of chest is examined.

Still further objects of the present invention will become apparent from the specification and drawings, in which.

Figure 3:
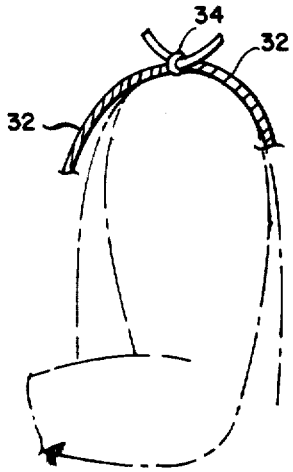
Figure 2:
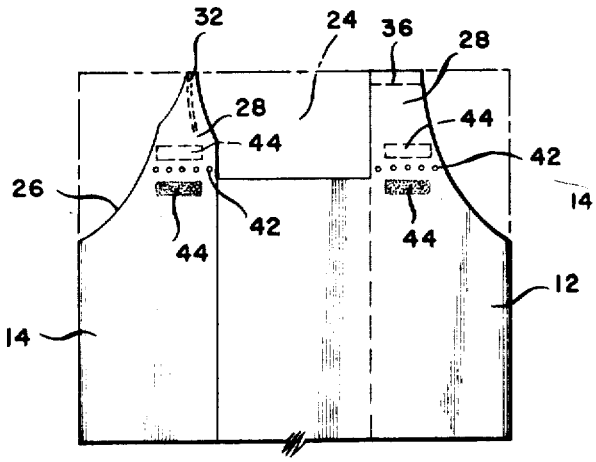

FIG. 2 is front view of portion of office disposable gown provided with perforations 42 and cohesive-adhesive 44 for reattachment of gown panels after examination of full expanse of chest and back; and FIG. 3 is a side view of office disposable gown secured with knot 34.

Figure 1:
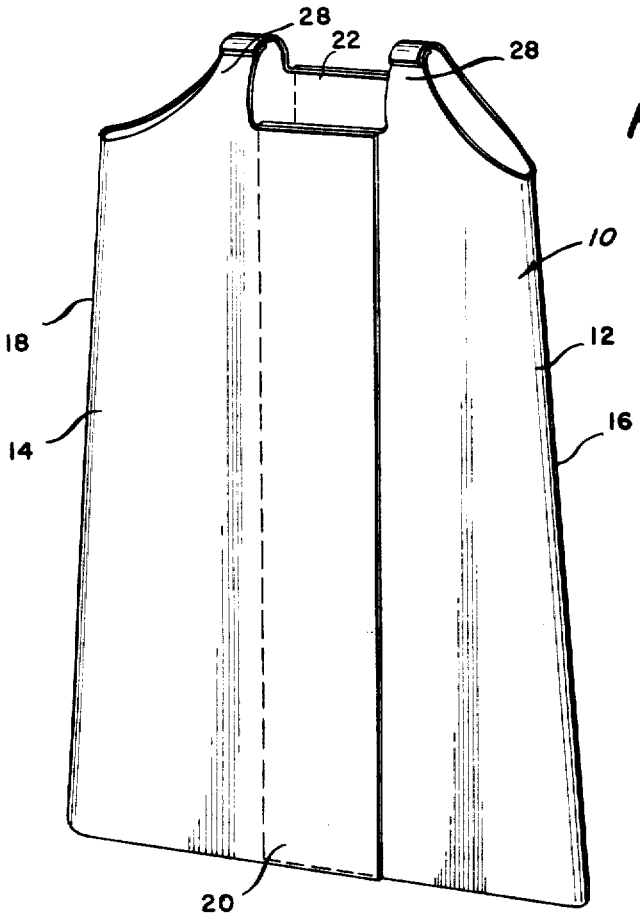
FIG. 1 is a perspective view of suggested office disposable gown embodying features of present invention.

As seen in FIG. 1, the office disposable gown is generally designated by reference numeral 10 and consists of first and second sheets 12 and 14 of disposable material folded along lines 16 and 18, respectively.

As sheets 12 and 14 are interleaved with one another, overlapping areas 20 and 22 are defined in front and behind. At the top of both sheets 12 and 14, cutout portions as seen in FIG. 2 define neck opening 24 and lateral arm openings 26 separated by shoulder straps 28.

Figure 1A:
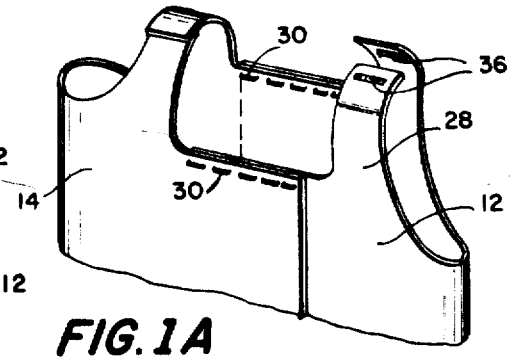
FIG. 1A is perspective view of office disposable gown illustrating fastening with staples 30 and adhesive.

Folded sheets 12 and 14 may be attached to each other immediately below neck opening 24 by any conventional technique, such as the staples 30 of FIG. 1A for example. Alternatively, adhesive, double-sided adhesive tape, pressure digitations, heat, or stitching may be employed.

Shoulder straps 28 are designed to be separated and reattached by any one of the following techniques:

As illustrated in FIG. 2, shoulder straps 28 may be folded longitudinally to form a string 32 permitting same to be tied together in knot 34 (FIG. 3). Also, as illustrated in FIG. 1A, both ends of shoulder straps 28 may be coated on one surface with a cohesive-adhesive 36 that has a low peel adherence that allows the shoulder straps to be peeled apart but a high shear adherence preventing same from being pulled apart. In this manner, after shoulder straps 28 are peeled apart, cohesive-adhesive 36 will allow them to adhere together again. Still further, the ends of shoulder straps 28 may be attached together by conventional snap fasteners (not shown) having male components on the posterior shoulder strap and female components on the anterior shoulder strap. Of course, additional fastening technique may include pressure-sensitive tape such as Velcro, buttons or hooks.

A further feature of office disposable gown 10 pertains to perforations 42 transversely located at the points where shoulder straps 28 are attached to front of gown, or transversely located at any point on the shoulder straps permitting same to be torn across enabling upper front panel 14 to be turned down for examining both breasts and the front of chest, or to enable the upper back panel to be turned down to examine back. After examination, the panels and shoulder straps may be reattached by any one of the following methods:

As illustrated in FIG. 2, the underside of the ends of shoulder straps 28 and the upper parts of panels 12 and 14 may be precoated with cohesive-adhesive 44 that has a high peel adherence and a high gear adherence similar to that used on self-sealing envelopes, permitting shoulder straps 28 to adhere to front of upper part of gown 10 for reattachment. Alternatively reattachment may be achieved by snaps, hooks, pressure-sensitive tape similar to Velcro or by a cohesive-adhesive that may be peeled apart and reattached. In this manner, shoulder straps 28 may be permanently attached together to form an intact shoulder strap, while permitting upper front panel 14 and upper back panel 12 to be turned down for examination after which shoulder straps 28 may be reattached.

Thus, low cost of material and ease of manufacture characterize office disposable gown 10. Instead of being constructed of several panels with stitched seams, as is prevalent in known gowns of similar nature, the present office disposable gown merely consists of two panels of paper or other disposable material that are folded and then interleaved together. In this manner, panels 12 and 14 may be divided in front and back between the thighs, but overlap permitting gown to remain closed when patient stands or walks. This overlap enables each fold of paper to cover the patient's thighs down to her knees, even while in lithotomy position. However, the office disposable gown does not protrude beyond the bottom of examination table between thighs because it is divided therebetween.

As will be apparent, the top half of gown 10 consists of a flap in front which covers the chest and a flap behind which covers the back. These flaps can be folded down to completely expose the front of chest separately or to completely expose back separately. This enables the breasts, the axilla, and base of neck to be examined in continuity without obstruction by the gown. Likewise, the entire chest may be examined in continuity without obstruction by the gown. After examination of chest, heart, breast and back, the front and back of upper half of gown are readily reattached.

Manifestly, changes in shape of office disposable gown 10, as well as alternative technique for attaching shoulder straps and panels of disposable material, may be employed without departing from the spirit and scope of invention.

I claim:

1. A disposable office gown, comprising: sheet disposable material having front and back panels overlapping to define front and back areas of double thickness and predetermined size, said panels also containing cutout portions defining neck and arm areas, said gown including near the tops of said panels means for attaching said panels together within said areas of overlapping, said gown further including means for separating selected portions of said neck and arm areas and reattaching same, said means for separating being located intermediate said neck and arm cutout areas, said means for separating and reattaching including perforations together with sealing means adjacent thereto.

2. A disposable office gown as in claim 1, wherein said perforations and sealing means are located at the juncture between the main body of said panels and remaining material defining said neck and arm areas.

3. A disposable office gown as in claim 1, said sealing means being a cohesive-adhesive with low peel adherence and high shear adherence.

*4. A disposable patient's examination gown with a top edge containing a medial neck opening and two arm openings, said grown being comprised of two panels of disposable material folded longitudinally to drape the right and left hand portions of the body and having overlapping front and back areas extending downwards from the neck opening; said panels secured together in the front and back areas of overlap in the region of the neck opening; said gown having left and right pairs of shoulder straps formed by the anterior and posterior portions of the upper part of the left and right panels between the neck opening and arm openings; each pair of shoulder straps having a coating on their confronting surfaces of a cohesive-adhesive having high shear adherence and low peel adherence enabling each pair of shoulder straps to attach together at their confronting surfaces and then be detached by peeling the confronting surfaces apart.*

References Cited

The following references, cited by the Examiner, are of record in the patented file of this patent or the original patent.

UNITED STATES PATENTS

| | | | |
|---|---|---|---|
| 1,233,156 | 7/1917 | Zeis | 2—114 |
| 2,692,989 | 11/1954 | Jelstrup | 2—114 |
| 2,818,573 | 1/1958 | O'Donnell | 2—114 |
| 2,973,523 | 3/1961 | Brainard et al. | 2—46 |
| 3,155,984 | 11/1964 | Derrick | 2—114 |
| 3,218,649 | 11/1965 | Ricter | 2—114 |
| 3,230,546 | 1/1966 | Sabee | 2—114 |
| 818,351 | 4/1906 | Clark | 2—114 |
| 2,364,568 | 12/1944 | Tiscornia | 2—50 |

FOREIGN PATENTS 600,109 6/1960 Canada.

OTHER REFERENCES

Sal-Dot Products Brochure, St. Louis, Mo.

RICHARD J. SCANLAN, Jr., Primary Examiner